(12) United States Patent
Lee et al.

(10) Patent No.: US 6,522,645 B1
(45) Date of Patent: Feb. 18, 2003

(54) COMPUTER TELEPHONY INTEGRATION SYSTEM AND OPERATION METHOD THEREIN

(75) Inventors: Huen Joo Lee, Seoul (KR); Min Jeong Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/129,887

(22) Filed: Aug. 6, 1998

(30) Foreign Application Priority Data

Aug. 14, 1997 (KR) .......................................... 97-39020

(51) Int. Cl.[7] ............................................... H04L 12/66
(52) U.S. Cl. ........................................ 370/352; 709/227
(58) Field of Search ................................. 370/352, 353, 370/354, 355, 356; 709/227, 228

(56) References Cited

U.S. PATENT DOCUMENTS 6,101,180 A * 8/2000 Donahue et al. ............. 370/352
6,272,126 B1 * 8/2001 Strauss et al. ............... 370/352

* cited by examiner

Primary Examiner—Huy D. Vu
Assistant Examiner—Thien D Tran
(74) Attorney, Agent, or Firm—Fleshner & Kim, LLP

(57) ABSTRACT

A computer telephony integration (CTI) system is capable of supporting one-to-one and multiparty communications. An operating method in the CTI system includes a first step for receiving a session opening request from a first user through a voice server thereof; a second step for detecting whether a session is held, in response to the session opening request, and generating, through the voice server thereof, a subserver for the sake of a new session according to its detecting result; a third step for determining a group address for a multiparty communication in the generated sub-server and informing the first user of the group address; a fourth step for assigning the group address to a voice data port by the first user according to the informed group address; a fifth step for providing a user list when the first user requests the user list so as to select users to be participated in the session and transmitting inviting messages to the users in case that the session participating users are selected; and a sixth step for assigning the group address to the voice data port of a user client system through users who want the telephone conversation, among the users receiving the inviting message through a watchdog of the client system, and making the users participate in the multiparty session.

6 Claims, 6 Drawing Sheets

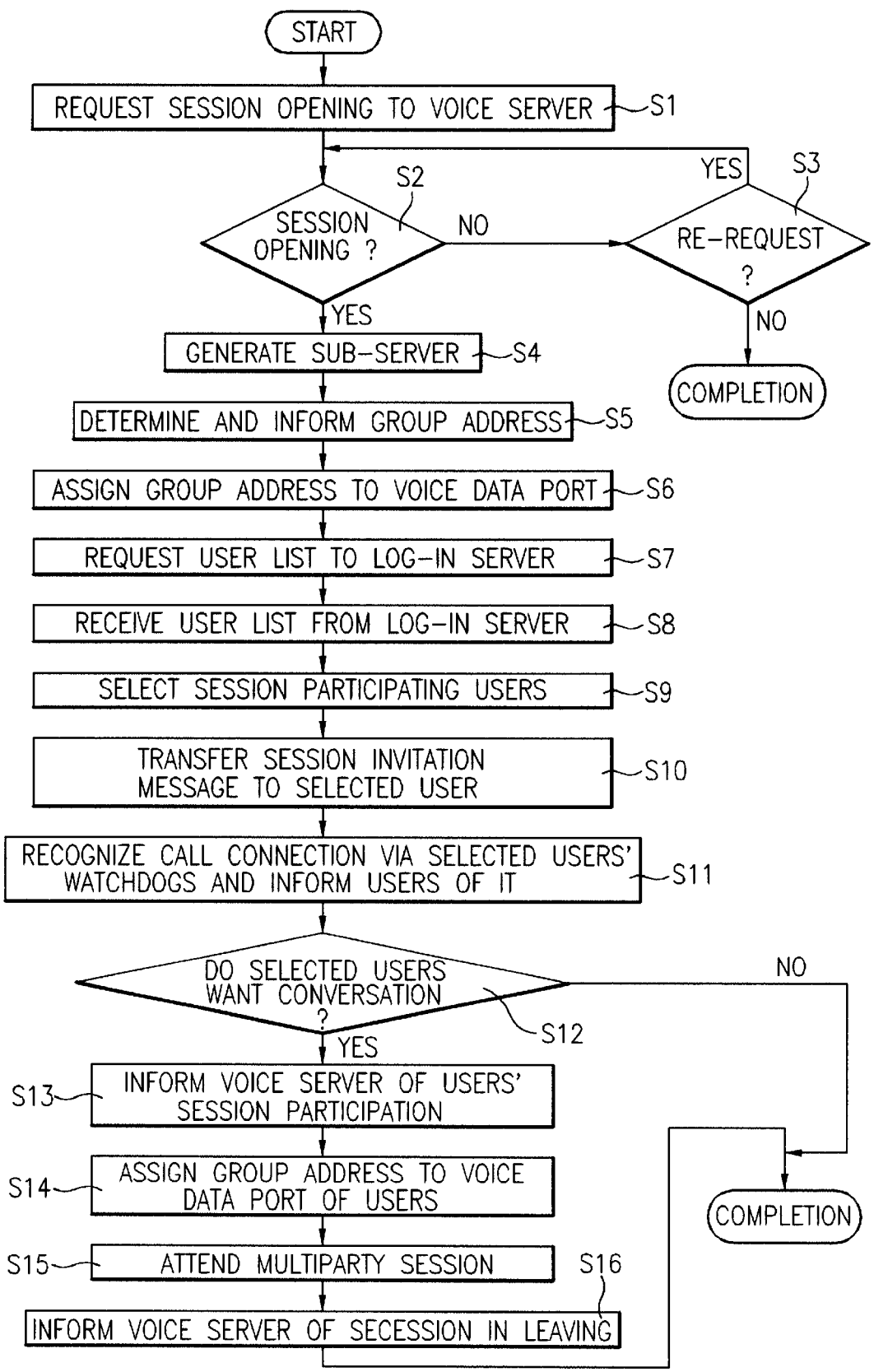

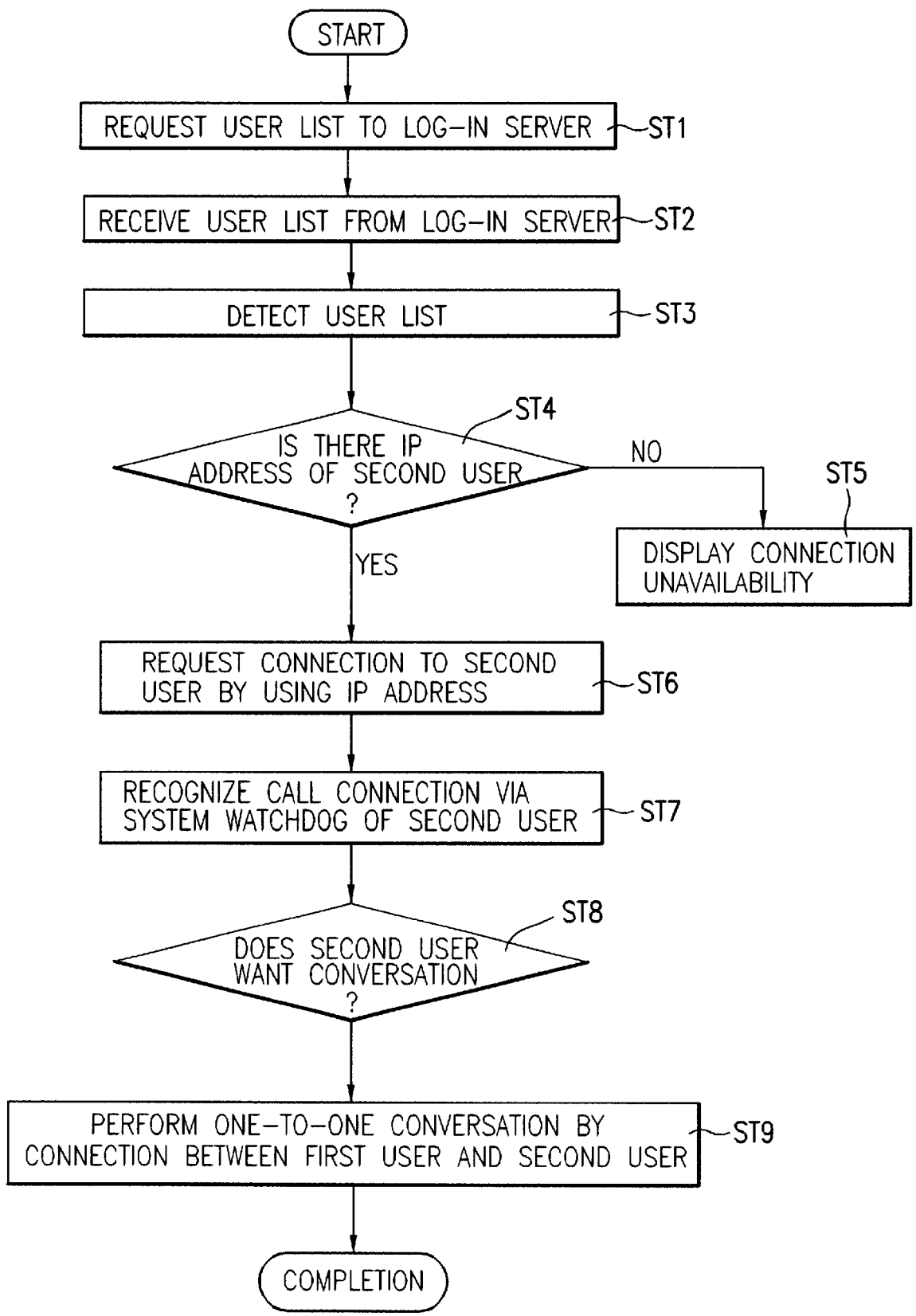

COMPUTER TELEPHONY INTEGRATION SYSTEM AND OPERATION METHOD THEREIN

BACKGROUND OF THE INVENTION

1. Field of the Invention

The present invention relates to a computer telephony integration system capable of supporting one-to-one and multiparty communications and an operating method therein.

2. Discussion of Related Art

There is frequently shown a recent status that a local area network (hereinafter, referred to as "LAN") is founded in a unitary establishment, information among users is commonly owned through the network, and desired information is gained through a connection to an outer internet.

It also comes to be valid through a developed personal computer technique that users possess terminal equipments improved in a price-to-performance ratio.

In the inside of a unitary establishment there is equipped a computer telephony integration (hereinafter, referred to as "CTI") system in order to integrate and manage a multimedia data service through a telephone service connected to the exterior and a network.

Such conventional technique CTI system makes a connection between a public switched telephone network (PSTN) and the LAN, and has an importance for providing telephone signals with a connection with information of an enterprise.

The computer telephony integration system based on a conventional art is described as follows, referring to the accompanied diagrams.

FIG. 1 shows a structure of a conventional computer telephony integration system. The computer telephony integration system includes an LAN 4 whose network range is limited spatially and whose users are restricted to a limited number, interior terminals 6a to 6f connected to the LAN 4, a gateway 2 connected with the LAN 4 and a PSTN 8, and an exterior terminal 10 coupled with the LAN 4.

Describing the conventional computer telephony integration system in detail referring to the diagram, it can be assumed that the exterior terminal 10 is dialed to call the CTI system and a standard telephone signal of the exterior terminal 10 is transmitted to the gateway 2 through the PSTN 8.

In the gateway 2, the transmitted standard telephone signal is converted into a digital signal, compressed, converted into a packet so as to be proper to an internet protocol (hereinafter, referred to as "IP"), and routed to the called interior terminal 6a to 6f, passing through the LAN 4.

The interior terminals 6a to 6f release the voice data packet transmitted through the LAN 4 and a network I/O from the compression, reproduce the data and transmit it to a user. In its opposite case, a user's voice is recorded, compressed, becomes a packet proper to the IP, passes through the network I/O and the LAN 4, and transmitted to the exterior terminal 10 through the gateway 2.

Meanwhile, in a case of calling the exterior terminal 10 by dialing the interior terminal 6a to 6f, reverse operations against the above processes are performed.

In the conventional computer telephony integration system, however, one-to-one connection structure is supported through a connection of the exterior telephone network with the LAN. That is, more various functions by a multiparty communication can not be provided users in a voice session etc.

SUMMARY OF THE INVENTION

Accordingly, the present invention is directed to a computer telephony integration system and its operating method that substantially obviate one or more of the limitations and disadvantages of the related art.

An object of the present invention is to provide a computer telephony integration system capable of supporting one-to-one and multiparty communication.

Another object of the present invention is to provide its operating method through a use of such computer telephony integration system or its corresponding apparatus.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, the computer telephony integration system having an LAN whose network range is limited spatially and which has a limited user and a gateway for connecting the LAN to a public switched telephone network (PSTN), is made up of a log-in server connected to the LAN, for managing information of a user who wants a communicative service; a voice server for generating and managing group addresses for a multiparty session according to users' request; and a client system connected to the LAN, for performing the multiparty session by using the generated group address.

One operating method through a use of the inventive computer telephony integration system includes a first step for receiving a session opening request from a first user through a voice server thereof; a second step for detecting whether a session is held, in response to the session opening request, and generating, through the voice server thereof, a sub-server for the sake of a new session according to its detecting result; a third step for determining a group address for a multiparty communication in the generated sub-server and informing the first user of the group address; a fourth step for assigning the group address to a voice data port by the first user according to the informed group address; a fifth step for providing a user list when the first user requests the user list so as to select users to be participated in the session and transmitting inviting messages to the users in case that the session participating users are selected; and a sixth step for assigning the group address to the voice data port of a user client system through users who want the telephone conversation, among the users receiving the inviting message through a watchdog of the client system, and making the users participate in the multiparty session.

Another operating method through a use of the inventive computer telephony integration system incudes a first step for receiving a request for a user list through a log-in server thereof from a first user; a second step for understanding an internet protocol address of a second user on the user list and performing a call connection by using the address; a third step for informing the second user of the call connection in such a way that a watchdog in a client system of the second user recognizes the call connection and provides it; and a fourth step for connecting the first user and the second user with each other so that they may converse with mutually if the second user wants to do a telephone conversation.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows the structure of a conventional computer telephony integration system.

FIG. 2 sets forth the structure of a computer telephony integration system in accordance with the present invention.

FIG. 5 provides a flow chart showing a multiparty communication based on an operating method in the inventive computer telephony integration system.

FIG. 6 furnishes a flow chart providing one-to-one communication based on the computer telephony integration operating method in the invention.

DETAILED DESCRIPTION OF PREFERRED EMBODIMENT

Reference will now be made in detail to the preferred embodiments of the present invention, examples of which are illustrated in the accompanying drawings.

Figure 1:
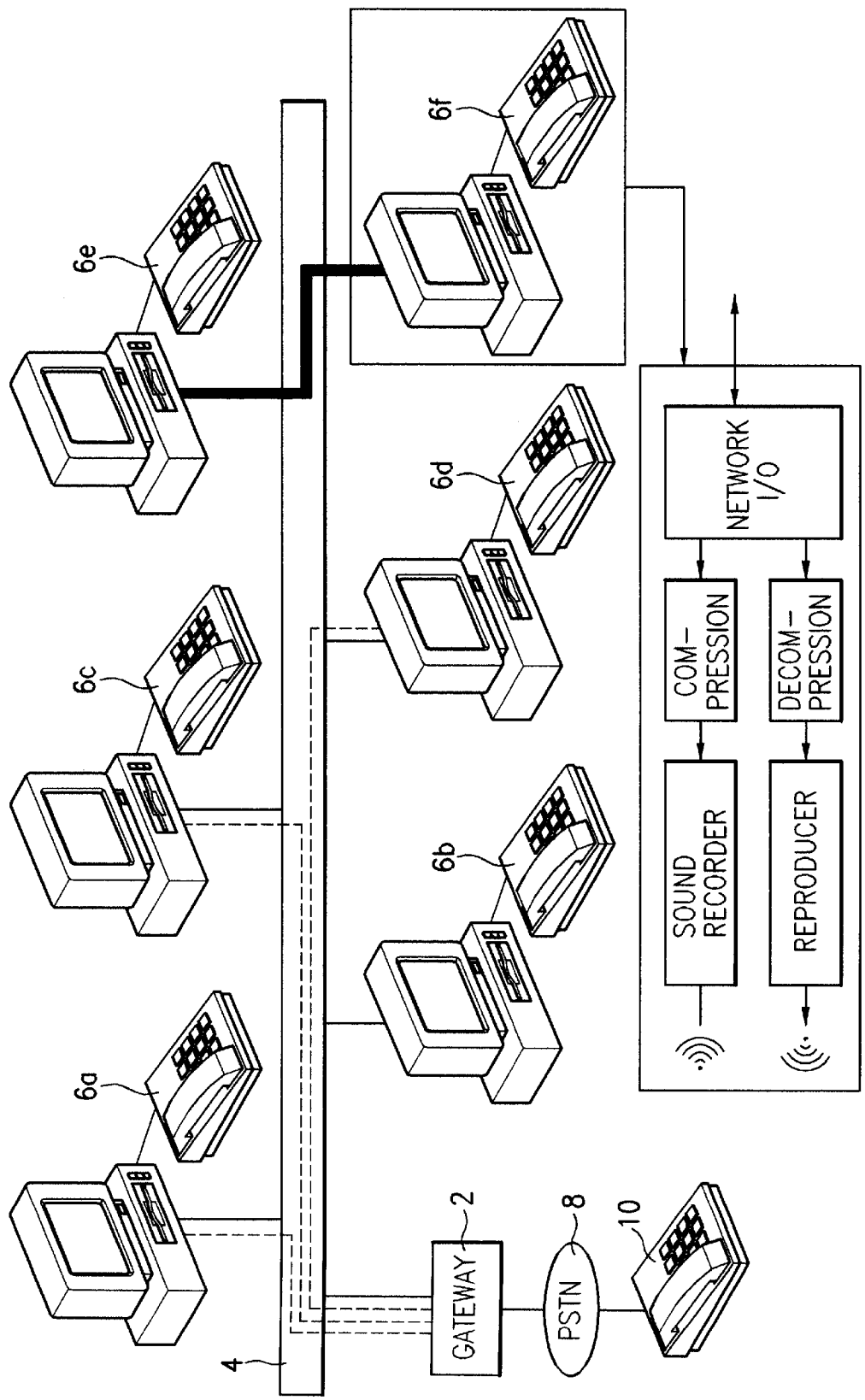
Figure 2:
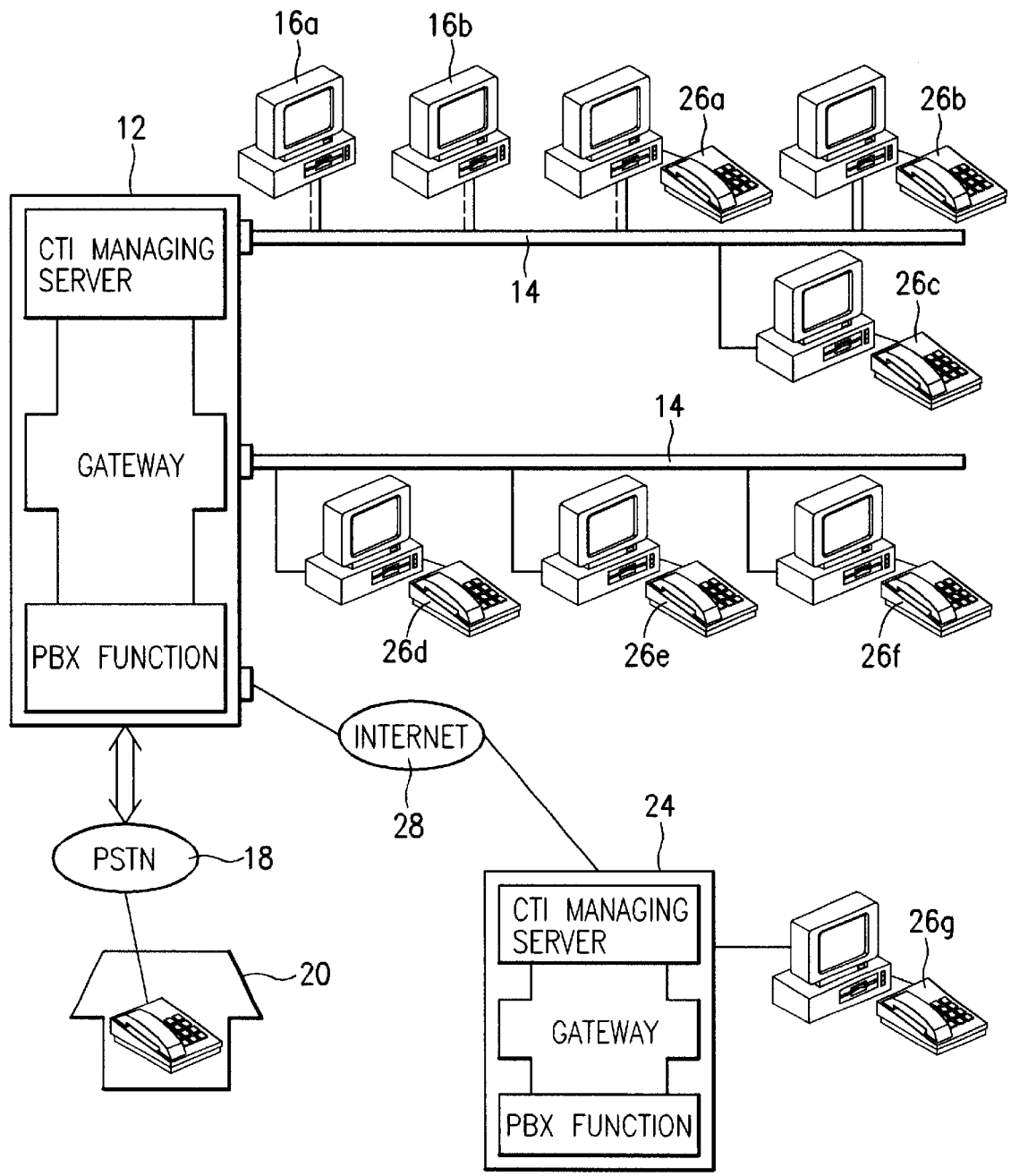

FIG. 2 represents the structure of a computer telephony integration system in accordance with the present invention. The computer telephony integration system includes an LAN 14 the network range of which is limited spatially and which limits the users to the limited number; client systems 26a to 26f, a log-in server 16a and a voice server 16b which are connected to the LAN 14; a gateway 12 for connecting the LAN 14 and a PSTN 18; a gateway 24 for executing an internet connection via the gateway 12 and an internet network 28; and a client system 26g.

Figure 3:
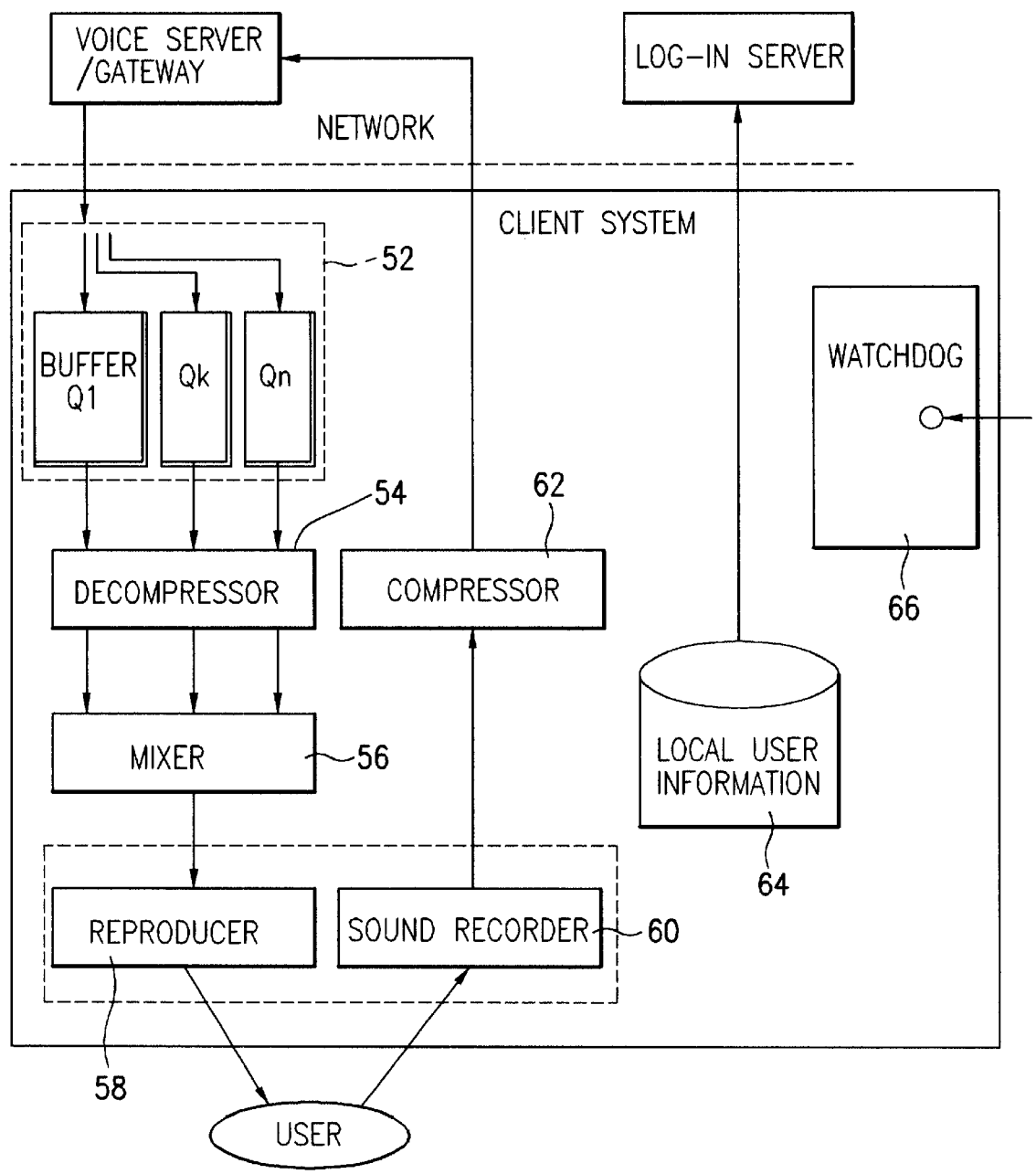
FIG. 3 represents a detailed block diagram providing a client system of FIG. 2.

FIG. 3 is a block diagram showing in detail the client system of FIG. 2. Each of the client systems 26a to 26f includes first to nth buffers 52 for temporarily storing compressed voice information of numerous users, a decompressor 54 for releasing the stored voice information from a compression, a mixer 56 for mixing properly the voice information released from the compression according to time information, and a reproducer 58 for reproducing the mixed voice.

Each of the client systems 26a to 26f further includes a sound recorder 60 for recording voice of the users, a compressor 62 for compressing the recorded voice information, a local user information unit 64 for storing information of local users, and a watchdog 66 for checking on a connection request of other users.

Figure 4:
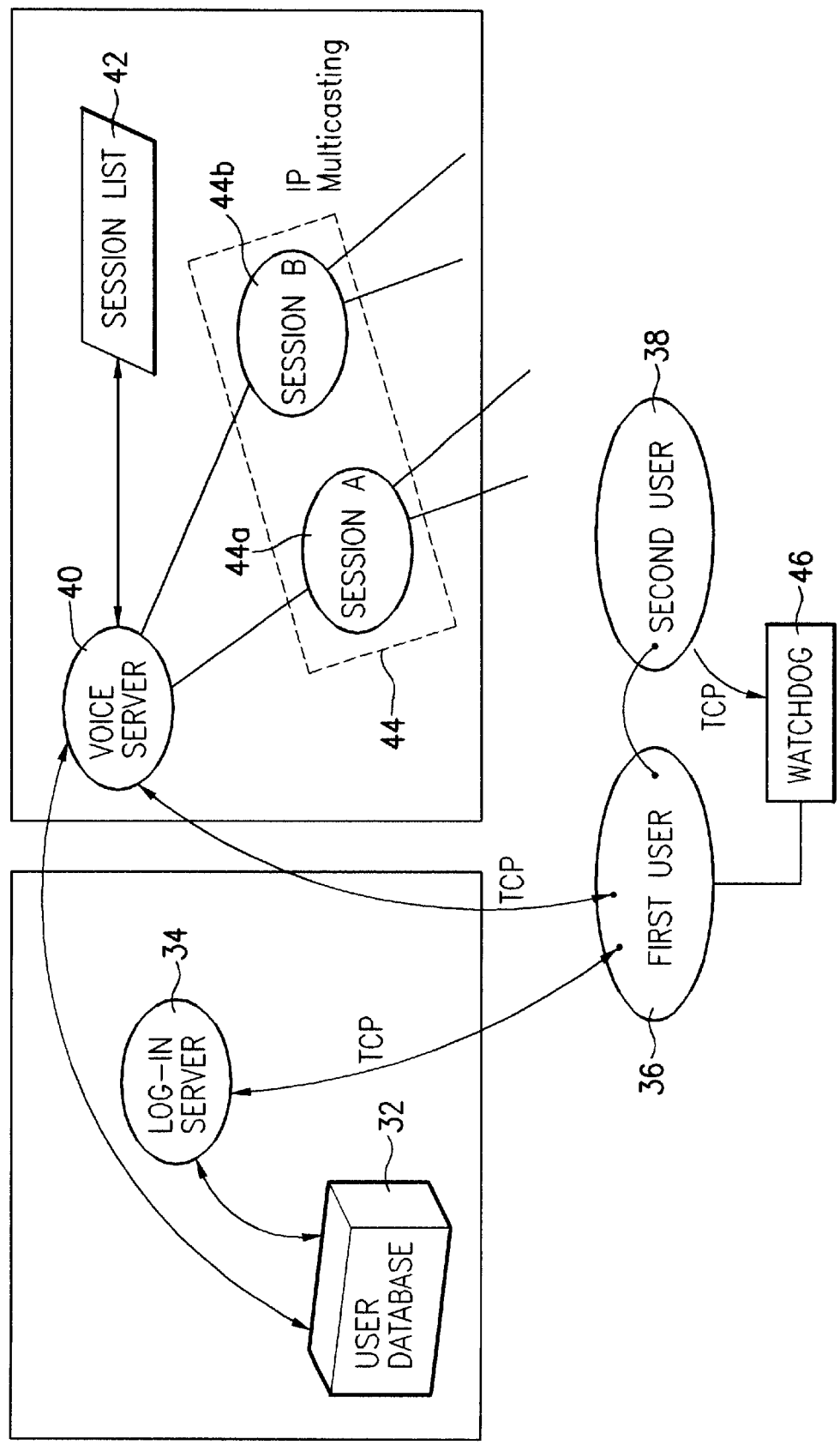
FIG. 4 illustrates an operating method through a use of an inventive computer telephony integration system.

FIG. 4 illustrates a connection relation between the client system and respective servers in communicating through a use of the inventive computer telephony integration system.

FIG. 5 provides a flow chart showing a multiparty communication based on an operating method in the inventive computer telephony integration system. FIG. 6 furnishes a flow chart providing one-to-one communication based on the computer telephony integration operating method in the invention.

With such construction the inventive computer telephony integration system and its operating method are explained in detail as follows, referring to the accompanied diagrams.

Assuming that the CTI system is called by dialing an exterior terminal 20, a standard telephone signal of the exterior terminal 20 is transmitted to the gateway 12 through the PSTN 18.

In the gateway 12, then, the transmitted standard telephone signal is converted into a digital signal, compressed, also converted into a packet so as to be proper to the IP, and routed to called client system 26a to 26f, passing through the LAN 14.

Meantime, in a case of calling the exterior terminal 20 by dialing the client system 26a to 26f, reverse operations against the above process order are performed.

Herewith, the log-in server 16a manages information related with users, and the voice server 16b manages sessions. The client systems 26a to 26f execute its respective corresponding functions, together with the servers.

The CTI system may be also connected to the client system 26g through the internet network 28 and the gateway 24.

The CTI system can perform the multiparty communication with only voice information. By the way, if the client systems 26a to 26f respectively have an additional installment of a digital camera capable of processing video signals, a display equipment capable of visually representing the video signals and a video server for processing the video signals, it will be available to execute the multiparty communication for the sake of a video session in the CTI system, simultaneously processing voice and video.

Supposing that the multiparty communication is being performed in the client system shown in FIG. 3, voice information of numerous users transmitted to the client systems 26a to 26f through the LAN 14 is compressed.

Such compressed voice information passes through the decompressor 54, being released from the compression, and then the voice information of numerous users is mixed in the mixer 56. The mixed voice information is transferred to the user in a sound through the reproducer 58.

Also, if a user of the client system 26a to 26f tries to transfer a voice to the other party, the user's voice is recorded in the sound recorder 60, the recorded voice information is compressed through the compressor 62 and changed to an IP packet type, and transmitted to the other party via the LAN 14.

In case there is a connection request from a third user in the midst of mutual communication, a watchdog informs the user of it, and the connection request can be performed according to a user's intention.

With reference to FIG. 4 showing a connection relation between the client system and each server and FIG. 5 illustrating the multiparty communicating way based on the operating method, in the inventive computer telephony integration system, an opening method for a voice session as one method out of the multiparty communications is described as follows.

In a step S1, a first user 36 requests for a session opening and contents for the session to a voice server 40, then the voice server 40 detects whether the session is opened or not. In steps S2 and S3, in case the session is not opened, the voice server 40 checks whether there is again a request from the first user, and if there is re-request, the voice server 40 again checks whether the session is opened or not.

In a step S4, the voice server 40 also generates a sub-server 44 for the sake of a new session in case that the session is held.

That is to say, the voice server 40 receives a request for a session opening from the first user 36, and extracts user information from a user database 32 to check whether or not the session can be started. If it is available, the voice server 40 generates the sub-server 44 for a new session.

In a step S5, the sub-server 44 determines a group address and informs the first user 36 of the group address. In other words, the sub-server 44 determines a multicasting group address, namely an IP multicasting, for the sake of a session that the sub-server 44 takes in charge.

Such session may be made up of a large number of sessions such as a session A 44a and a session B 44b, etc., and such numerous sessions are written and extracted on/from a session list 42 by the voice server 40.

In a step S6, then, the first user 36 assigns the group address received from the sub-server 44 to a communication port as a voice data port, and receives and transmits the voice data from/to the communication port.

In a step S7, the first user 36 requests a log-in server 34 for the user list. Then, the log-in server 34 extracts the user list from the user data base 32 according to its request and transfers the list to the first user 36.

In steps S8 to S10, therefore, the first user 36 receives the user list from the log-in server 34 and selects users to be participated in the session, and then transmits session inviting messages to corresponding users.

In steps S11 to S13, each of the system watchdogs of users who received the inviting messages, recognizes a communication connection and informs the users of it. After that, each of the watchdogs detects whether the users wants a telephone conversation, and if wants, each watchdog transmits a session participating information to the voice server 40.

In steps S14 to S16, each client system of the users assigns a group address to a voice data port, thereby the users participate in the multiparty session, and inform the voice server 40 of their own secession when they leave the multiparty session.

With reference to FIG. 6 showing a flow chart for one-to-one communication based on the inventive CTI operating method, one-to-one communicating method is described as follows.

In a step ST1, the first user 36 requests the log-in server 34 to transfer a user list. The log-in server 34 transfers the user list extracted from the user database to the first user 36.

In steps ST2 to ST4, the first user 36 detects, on the user list transferred from the log-in server 34, an IP address of a second user 38, who wants one-to-one telephone conversation, and checks whether there exists the IP address of the second user 38.

In a step ST5, in case there does not exist the IP address of the second user 38, it is displayed that its connection is not available. In a step ST6, if the IP address exists, the first user 36 requests the second user 38 to perform its connection.

In steps ST7 and ST8, a system watchdog of the second user 38 recognizes a connection request for a telephone conversation provided from the first user 36, informs the second user 38 of it, and detects whether the second user 38 wants the conversation.

In a step ST9, if the second user 38 wants its conversation, the client system of the second user 38 is directly connected with the first user 36, TCP/IP, to thereby execute one-to-one telephone conversation.

In accordance with the present invention, as aforementioned, various functions such as a voice session, for the sake of users, may be provided through one-to-one and multiparty communications in the CTI system and its operating method.

It will be apparent to those skilled in the art that various modifications and variations can be made in the computer telephony integration system and its operating method of the present invention without deviating from the spirit or scope of the invention. Thus, it is intended that the present invention cover the modifications and variations of this invention provided they come within the scope of the appended claims and their equivalents.

What is claimed is:

1. A computer telephony integration (CTI) system having a local area network (LAN) whose network range is limited spatially and which has a restricted user and a gateway connected with the LAN and a public switched telephone network, said system comprising:

a log-in server connected to said LAN, for managing information of a user who wants a communicative service;

a sub-server for determining a group address of a multiparty session and informing said user of the group address;

a voice server for generating and managing said sub-server according to a request of said user; and a client system connected to the LAN, for performing the multiparty session by using the generated group address, wherein said client system comprises, first to nth buffers for storing compressed voice information of numerous users temporarily, respectively, a decompressor for releasing said stored voice information from a compression, a mixer for properly mixing first to nth voice information released from the compression in response to time information, and a reproducer for reproducing the mixed voice.

2. The CTI system of claim 1, wherein said client system further comprises:

a sound recorder for recording voice of the user;

a compressor for compressing the recorded voice information; and a watchdog for checking on a connection request of other users.

3. An operating method through a use of a CTI system comprising:

a first step of receiving a session opening request provided from a first user via a voice server thereof;

a second step of detecting whether a session is held, in response to the session opening request, and generating, through said voice server, a sub-server for the sake of a new session according to its detecting result;

a third step of determining a group address for a multiparty communication in the generated sub-server and informing the first user of the group address;

a fourth step of making the first user assign the group address to a voice data port according to the informed group address;

a fifth step of providing a user list when the first user requests the user list so as to select users to be participated in the session and transmitting inviting messages to the users in case that the session participating users are selected; and a sixth step of assigning the group address to the voice data port of a user client system by users who want a telephone conversation, among the users receiving the inviting message through a watchdog of the client system, and making the users participate in a multiparty session.

4. The operating method of claim 3, wherein said second step comprises the steps of:

checking whether or not the session can be opened, in the voice server which received the session opening request from the first user;

detecting whether there is a re-request from the first user in case that the session is not opened as the checking result, and again detecting whether the session is held or not if there is the re-request; and generating a sub-server in case the new session is held as the result in the checking step.

5. The method of claim 3, wherein said fifth step further comprises the steps of:

providing the first user with the user list through a log-in server thereof;

making the first user select users to be participated in the session; and transferring the session invitation messages to selected users.

6. An operating method through a use of a CTI system comprising:

(a) receiving a request for a user list from a first user through a log-in server thereof;

(b) understanding an internet protocol (IP) address of a second user represented on the user list and requesting a voice server to perform a call connection with the second user using the IP address;

(c) informing the second user of the call connection by recognizing the call connection through a system watchdog of the second user;

(d) connecting the first user and the second user with each other so that they may converse mutually, if the second user wants to converse with the first user; wherein step (b) further comprises, transferring the user list to the first user through the log-in server, and detecting, on the user list, the IP address of the second user who wants a telephone conversation.

\* \* \* \* \*